(12) United States Patent
Tomes

(10) Patent No.: US 12,618,339 B2
(45) Date of Patent: May 5, 2026

(54) DESTABILIZER INDUCED BUCKLING IN SPOKED BEARING SUPPORT

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 189 days.

(21) Appl. No.: 18/749,165

(22) Filed: Jun. 20, 2024

(65) Prior Publication Data

US 2025/0389204 A1     Dec. 25, 2025

(51) Int. Cl.
F16C 27/04 (2006.01)
F01D 25/16 (2006.01)

(52) U.S. Cl.
CPC ............ F01D 25/164 (2013.01); F16C 27/04 (2013.01); F16C 2360/23 (2013.01)

(58) Field of Classification Search
CPC ..... F16C 27/04; F16C 2360/23; F01D 25/164
See application file for complete search history.

(56) References Cited

U.S. PATENT DOCUMENTS

| | | | |
|---|---|---|---|
| 6,079,200 A | 6/2000 | Tubbs | |
| 8,430,622 B2 | 4/2013 | Webster et al. | |
| 9,777,592 B2 * | 10/2017 | Denis | .................... F01D 21/045 |

| | | | |
|---|---|---|---|
| 9,777,596 B2 | 10/2017 | Raykowski et al. | |
| 9,909,451 B2 * | 3/2018 | Carter | ................... F16C 35/073 |
| 10,274,017 B2 | 4/2019 | Ganiger et al. | |
| 11,702,993 B2 | 7/2023 | Buchholz | |
| 2020/0157971 A1 | 5/2020 | Buchholz et al. | |

FOREIGN PATENT DOCUMENTS

| | | |
|---|---|---|
| CA | 2471665 A1 | 12/2004 |
| EP | 1659266 A1 | 5/2006 |

OTHER PUBLICATIONS

Extended European Search Report for EP Application No. 25184001. 3, dated Oct. 30, 2025, pp. 1-6.

* cited by examiner

*Primary Examiner* — Phillip A Johnson
(74) *Attorney, Agent, or Firm* — CANTOR COLBURN LLP

(57)     ABSTRACT
A bearing arrangement of a gas turbine engine includes a first bearing supportive of a shaft, a second bearing axially offset from the first bearing, a first bearing support extending from a bearing housing to the first bearing to support the first bearing and a second bearing support extending to and supportive of the second bearing. One or more radial bearing supports include a plurality of radial spokes extending between the bearing housing and the second bearing. The plurality of radial spokes are configured to buckle under compression when radial loads at the second bearing exceed a predetermined threshold. At least one destabilizer is secured to the second bearing and is configured to contact at least one radial spoke of the plurality of radial spokes upon failure of the first bearing support to reduce the predetermined threshold sufficiently to initiate buckling of the plurality of radial spokes.

20 Claims, 8 Drawing Sheets

DESTABILIZER INDUCED BUCKLING IN SPOKED BEARING SUPPORT

BACKGROUND

Exemplary embodiments pertain to the art of turbomachinery such as gas turbine engines. In particular, the present disclosure relates to bearing assemblies and support of bearing assemblies of gas turbine engines.

During a fan blade off event (FBO), some designs require that two bearings on the engine be broken to help limit the load and vibrations transferred from the rotor to the engine and aircraft structure caused by the unbalance resulting from the FBO.

A typical bearing support 200 configuration is illustrated in FIG. 14. A first bearing 202 is a roller bearing supporting radial loads, and requires low support stiffness and is broken by buckling of a first bearing support 204. A second bearing 206 is a ball bearing, supportive of axial and radial loads. The second bearing 206 requires high support stiffness and is broken by fracturing bolts 210 between the second bearing 206 and a second bearing support 208. Configuring the bolts 210 to always break at FBO, requiring high stress, but to not yield at limit loads or during installation and have a full low-cycle fatigue life, all requiring low stress, is very difficult.

BRIEF DESCRIPTION

In one exemplary embodiment, a bearing arrangement of a gas turbine engine includes a first bearing supportive of a shaft, a second bearing axially offset from the first bearing and supportive of the shaft, a first bearing support extending from a bearing housing to the first bearing to support the first bearing and a second bearing support extending to and supportive of the second bearing. One or more radial bearing supports include a plurality of radial spokes extending between the bearing housing and the second bearing. The plurality of radial spokes are configured to buckle under compression when radial loads at the second bearing exceed a predetermined threshold. At least one destabilizer is secured to the second bearing and is configured to contact at least one radial spoke of the plurality of radial spokes upon failure of the first bearing support to reduce the predetermined threshold sufficiently to initiate buckling of the plurality of radial spokes.

Additionally or alternatively, in this or other embodiments the at least one destabilizer is secured to one of a bearing outer race or a bearing inner race of the second bearing.

Additionally or alternatively, in this or other embodiments the at least one destabilizer is configured to contact the plurality of radial spokes in a tangential direction to initiate tangential buckling of the plurality of radial spokes.

Additionally or alternatively, in this or other embodiments each destabilizer is located circumferentially between adjacent radial spokes of the plurality of radial spokes.

Additionally or alternatively, in this or other embodiments the at least one destabilizer is configured to contact the plurality of radial spokes in an axial direction to initiate axial buckling of the plurality of radial spokes.

Additionally or alternatively, in this or other embodiments each destabilizer is circumferentially aligned with a radial spoke of the plurality of radial spokes.

Additionally or alternatively, in this or other embodiments the radial bearing support includes an outer ring positioned at the bearing housing, and the plurality of radial spokes extend from the outer ring to the second bearing.

Additionally or alternatively, in this or other embodiments a spoke tip of each of the radial spokes are configured to contact the second bearing while not being secured thereto.

Additionally or alternatively, in this or other embodiments one or more bumpers axially offset from the radial bearing support are configured to limit radial travel of the second bearing upon buckling of the plurality of radial spokes.

Additionally or alternatively, in this or other embodiments the one or more bumpers is two bumpers, and the radial bearing support is disposed axially between the two bumpers.

In another exemplary embodiment, a gas turbine engine includes a combustor, a turbine driven by combustion products of the combustor, a shaft driven by rotation of the turbine, and a bearing arrangement supportive of the shaft. The bearing arrangement includes a first bearing, a second bearing axially offset from the first, a first bearing support extending from a bearing housing to the first bearing to support the first bearing, and a second bearing support to and supportive of the second bearing. One or more radial bearing supports include a plurality of radial spokes extending between the bearing housing and the second bearing. The plurality of radial spokes are configured to buckle under compression when radial loads at the second bearing exceed a predetermined threshold. At least one destabilizer is secured to the second bearing and is configured to contact at least one radial spoke of the plurality of radial spokes upon failure of the first bearing support to reduce the predetermined threshold sufficiently to initiate buckling of the plurality of radial spokes.

Additionally or alternatively, in this or other embodiments the at least one destabilizer is secured to one of a bearing outer race or a bearing inner race of the second bearing.

Additionally or alternatively, in this or other embodiments the at least one destabilizer is configured to contact the plurality of radial spokes in a tangential direction to initiate tangential buckling of the plurality of radial spokes.

Additionally or alternatively, in this or other embodiments each destabilizer is located circumferentially between adjacent radial spokes of the plurality of radial spokes.

Additionally or alternatively, in this or other embodiments the at least one destabilizer is configured to contact the plurality of radial spokes in an axial direction to initiate axial buckling of the plurality of radial spokes.

Additionally or alternatively, in this or other embodiments each destabilizer is circumferentially aligned with a radial spoke of the plurality of radial spokes.

Additionally or alternatively, in this or other embodiments the radial bearing support includes an outer ring positioned at the bearing housing, and the plurality of radial spokes extend from the outer ring to the second bearing.

Additionally or alternatively, in this or other embodiments a spoke tip of each of the radial spokes are configured to contact the second bearing while not being secured thereto.

Additionally or alternatively, in this or other embodiments one or more bumpers are axially offset from the radial bearing support are configured to limit radial travel of the second bearing upon buckling of the plurality of radial spokes.

Additionally or alternatively, in this or other embodiments the one or more bumpers is two bumpers, and the radial bearing support is positioned axially between the two bumpers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
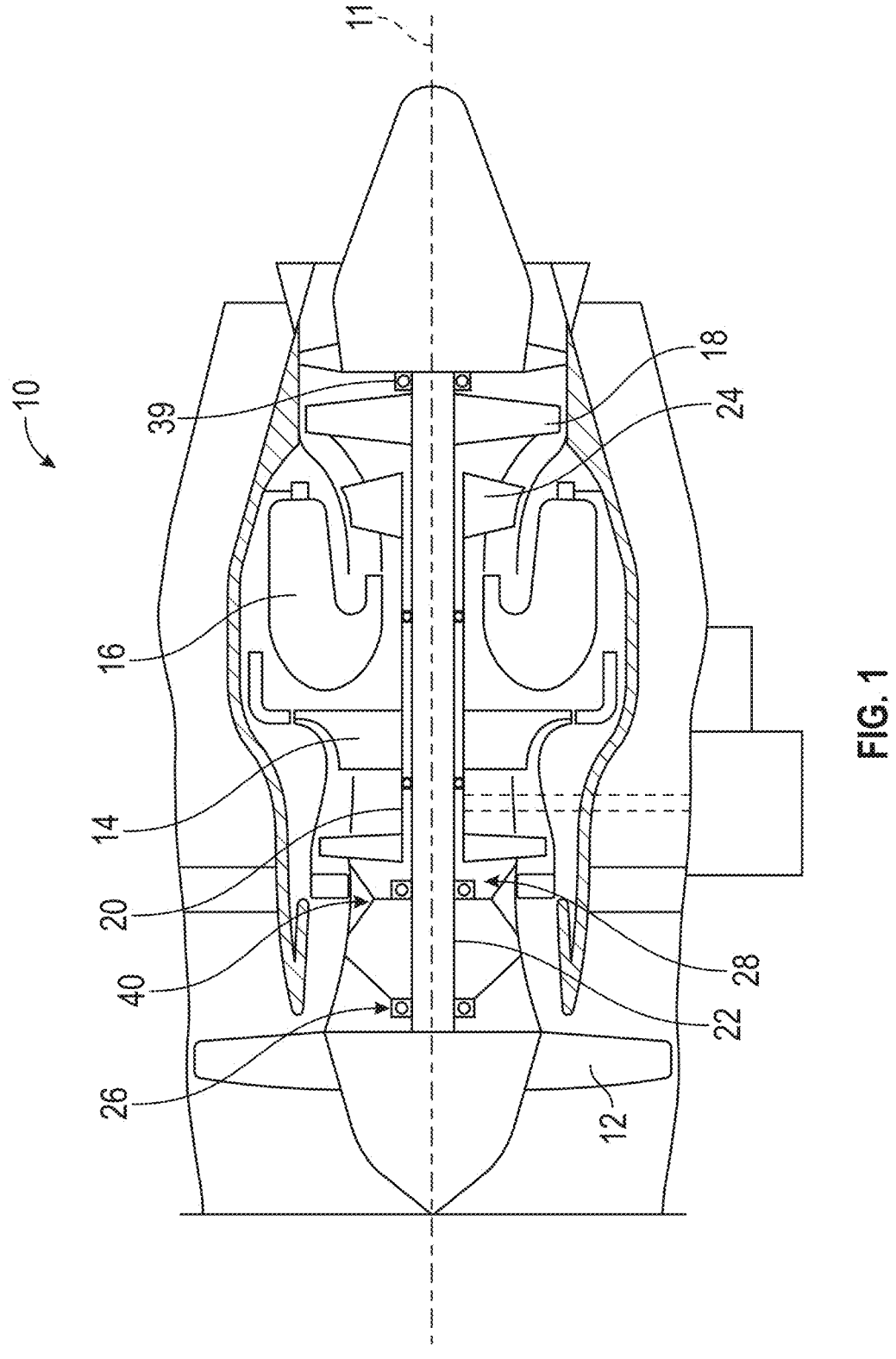
FIG. 1 is a partial cross-sectional view of a gas turbine engine.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third bearing 39 which may be the #5 bearing of the engine (the #3 and #4 bearings rotatably supporting the high pressure shaft 20). The bearing arrangement for a particular engine, including but not limited to the number and type of bearings selected, is typically determined by a number of factors specific to that engine.

The bearing arrangement described herein is exemplary only, and is not intended to be limiting. In this example, the forward and rearward most bearings, i.e. the #1 and #5 bearings, may be roller bearings for radially supporting the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine 10. The bearings and supporting structure flanges may be arranged in any suitable fashion in the context of the present application.

Figure 2:
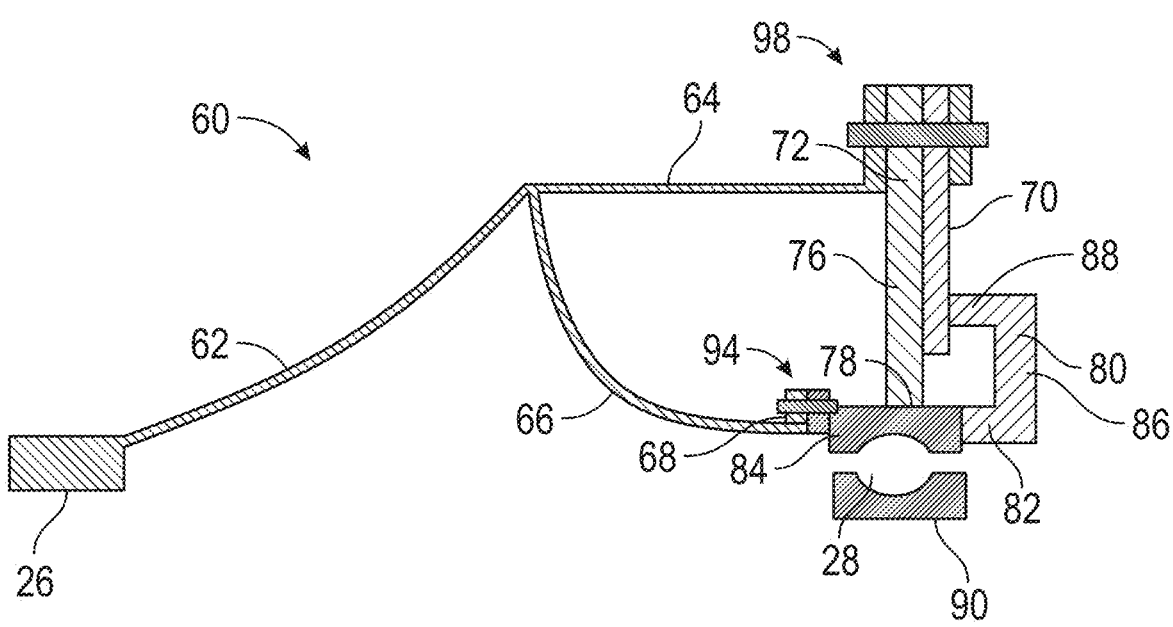
FIG. 2 is a schematic cross-sectional view of an embodiment of a bearing support arrangement of a gas turbine engine.

Referring now to FIG. 2, illustrated is an embodiment of a bearing support arrangement 60. A first bearing 26, a roller bearing, which is also illustrated in FIG. 1, is supported and positioned by a first bearing support 62, which extends from a bearing housing 64. A second bearing 28, a ball bearing, which is also illustrated in FIG. 1, is supported by a second bearing support 66, which in some embodiments also extends from the bearing housing 64. While the embodiments herein describe and illustrate the second bearing support 66 extending from the bearing housing 64, one skilled in the art will readily appreciate that in other embodiments, the second bearing support 66 could extend from other engine structure. The second bearing support 66 must provide sufficiently stiff axial support for the second bearing 28 for rotor stability, but it must not carry significant radial loading. This can be achieved with features like a squirrel cage or hairpin. In some embodiments, the second bearing support 66 can have a shared load path with the first bearing support 62, but this is not required.

Figure 13:
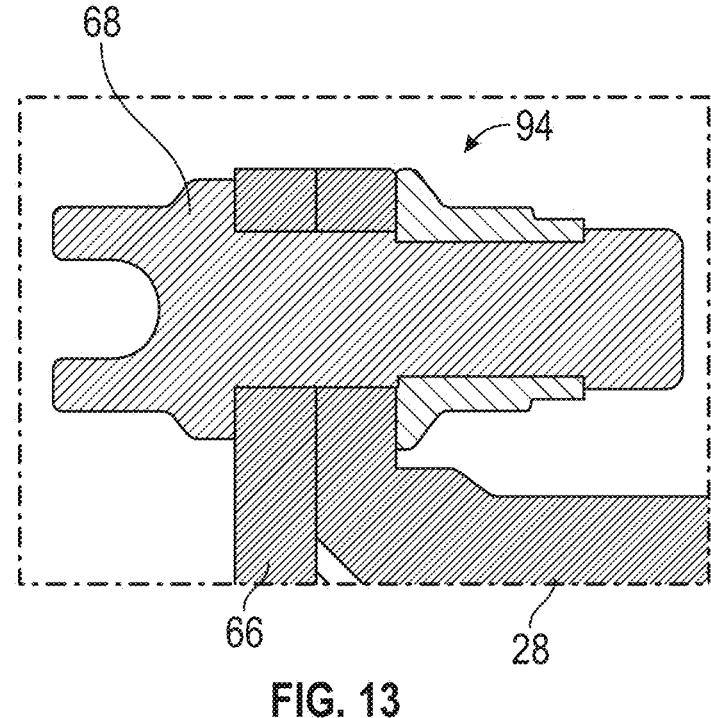
FIG. 13 is a cross-sectional illustration of an embodiment of an inner flange arrangement.
Figure 14:
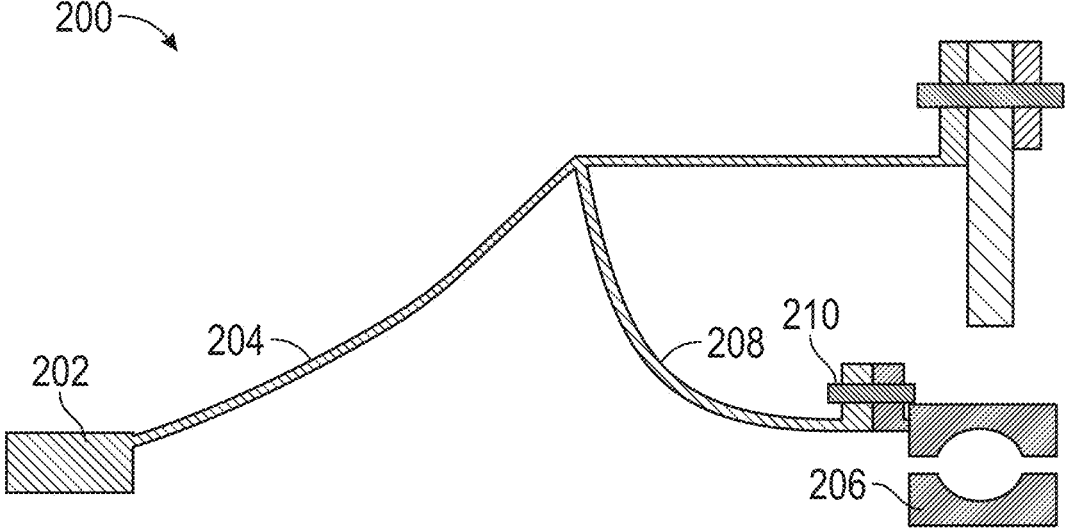
FIG. 14 is a schematic illustration of a previous bearing support arrangement of a gas turbine engine.

Bolts 68 are disposed between the second bearing 28 and the second bearing support 66, and are, in some embodiments, configured to fracture in a fan blade off (FBO) condition. While fracture or failure of the bolts is not required, in some embodiments fracture may improve dynamic behavior. As illustrated in FIG. 13, the bolts 68 extend through an inner flange arrangement 94 to connect the second bearing support 66 to the second bearing 28. A bumper 70 extends from the bearing housing 64 radially inwardly toward the second bearing 28 to limit radial displacement of the second bearing 28. Additionally, a radial support 72 surrounds the second bearing 28.

Figure 3:
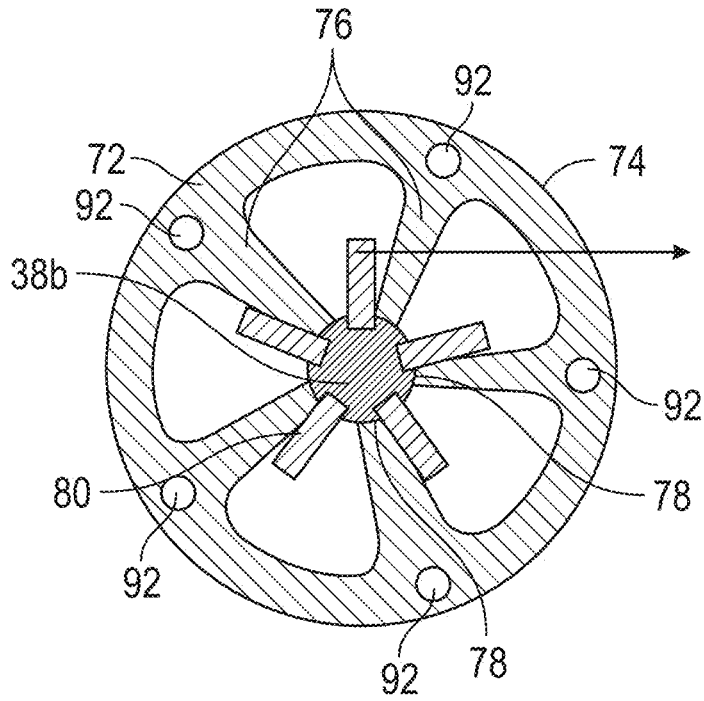
FIG. 3 is an axial cross-sectional view of an embodiment of a radial support of a bearing arrangement including a destabilizer.
Figure 12:
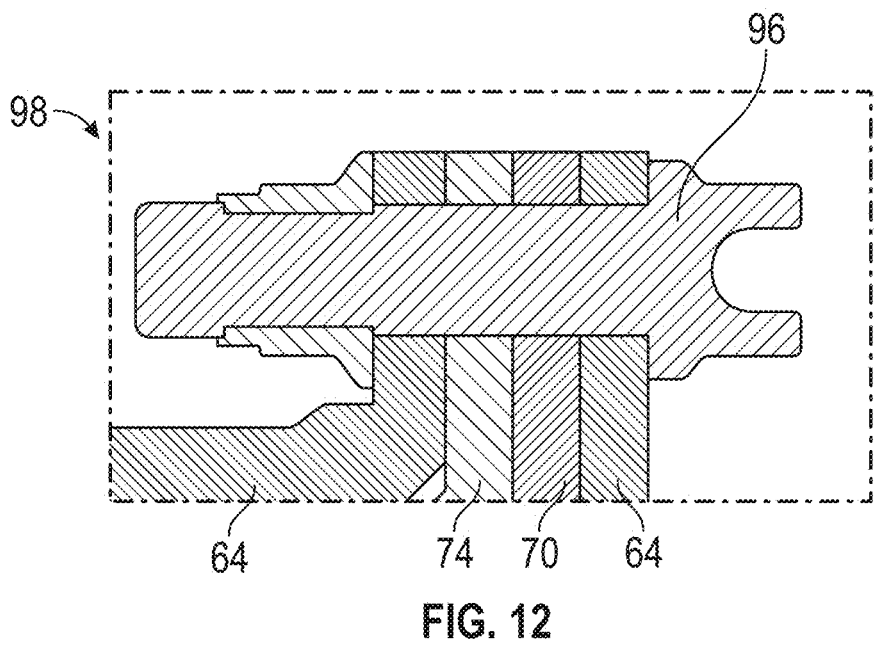
FIG. 12 is a cross-sectional illustration of an embodiment of an outer flange arrangement.

Referring now to FIG. 3, an embodiment of the radial support 72 is illustrated. The radial support 72 includes an outer ring 74 disposed at and secured to the bearing housing 64, and a plurality of radial spokes 76 extending from the outer ring 74 toward the second bearing 28. The radial spokes 76 each include a spoke tip 78 that contacts the second bearing 28, but is not secured to the second bearing 28. In some embodiments, as illustrated in FIG. 12, the outer ring 74 is secured to the bearing housing 64 using fasteners and the bumper 70 at outer flange arrangement 98 using fasteners 96 extending through fastener openings shown schematically in FIG. 3 as 92. Referring again to FIG. 2, the spoke tip 78 may include an uneven profile, one that is, for example, curvilinear, to both ensure compression on the spoke 76 and to ensure that the radial contact force of the second bearing 28 is axially centered on the spoke 76. The spokes 76 are configured to buckle to limit the loads in the engine 20 during an FBO event while also providing a high radial stiffness during normal operation. Buckling of the spokes 76 occurs when there are compressive loads on the spokes 76 above a predetermined level. The failure force required for such buckling to occur is significantly less than the failure force required without buckling, which causes the engine 20 to feel less stress.

The buckling capacity of the radial support 72 is configured to be greater than those experienced during FBO/rundown.

Figure 4:
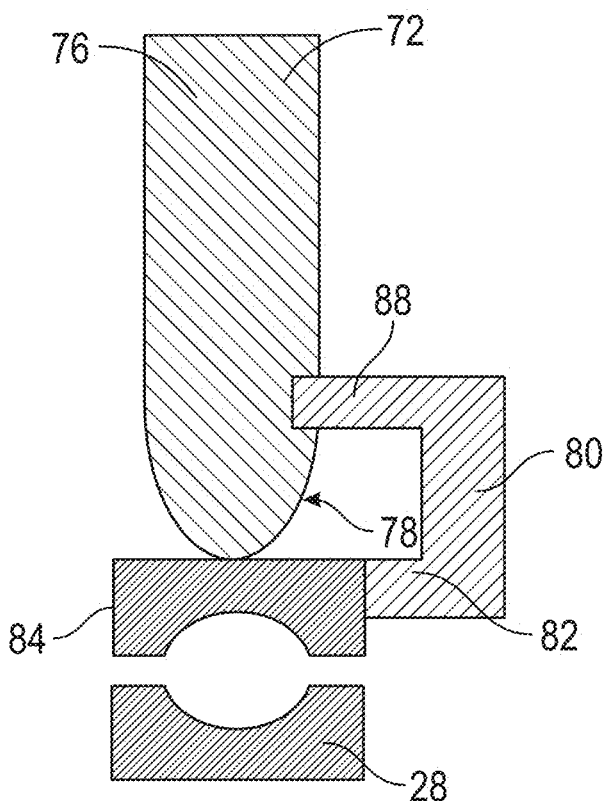
FIG. 4 is another cross-sectional view of an embodiment of a radial support of a bearing arrangement including a destabilizer.

To aid in buckling the plurality of spokes 76 during the FBO event by reducing the buckling capacity of the radial support 72 below those experienced during and FBO/rundown, one or more destabilizers 80 are positioned at the second bearing 28 and are interactive with the plurality of spokes 76 during the FBO event. In particular, and with reference to FIGS. 3 and 4, an embodiment of a destabilizer 80 includes a destabilizer base 82 connected to a bearing outer race 84 of the second bearing 28, and a destabilizer arm 86 extending radially outwardly from the destabilizer base 82. A destabilizer finger 88 extends axially toward the radial support 72 from the destabilizer arm 86. The destabilizer finger 88 is positioned circumferentially between adjacent spokes 76 of the plurality of spokes 76.

Figure 5:
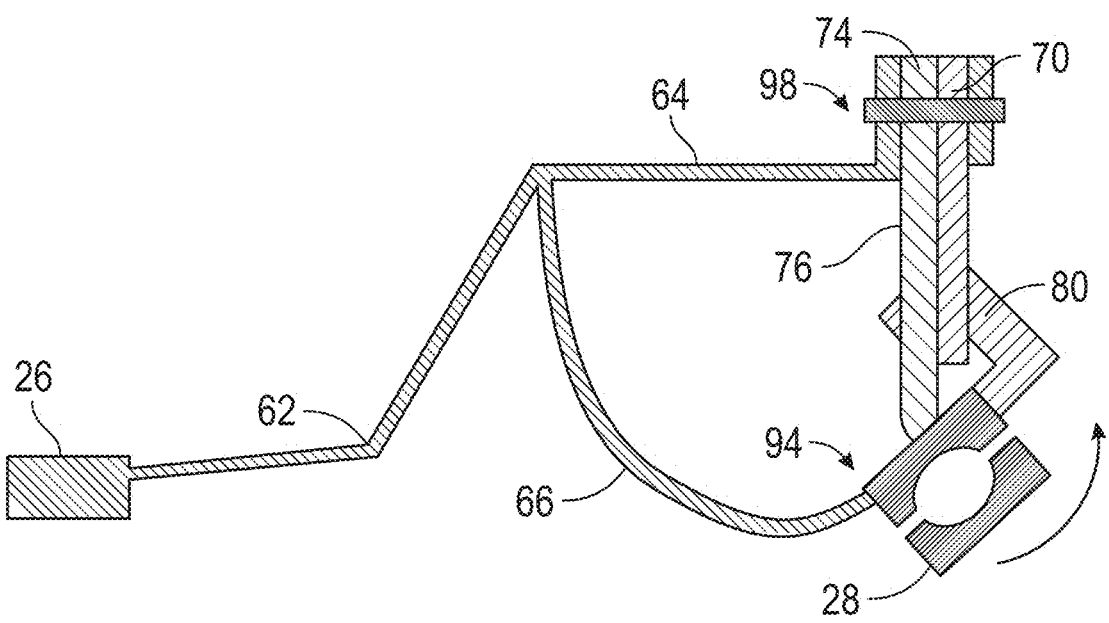
FIG. 5 is a schematic cross-sectional illustration of an embodiment of a bearing support arrangement during a fan blade off (FBO) event.
Figure 6:
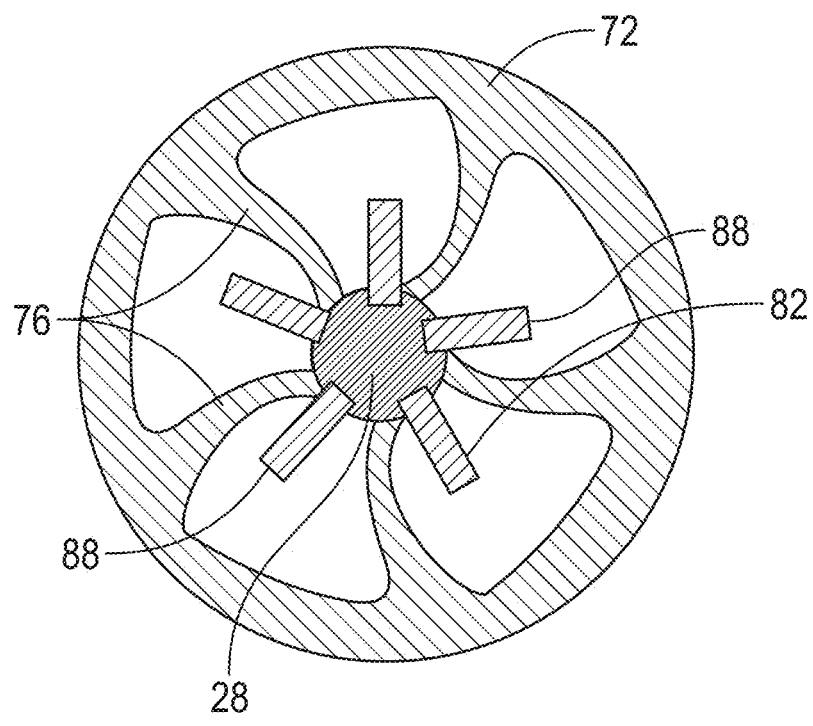
FIG. 6 is an axial cross-sectional view of an embodiment of a radial support during the FBO event.

Referring now to FIGS. 5 and 6, during an FBO event, a moment occurs which causes the second bearing to tilt 28. This tilt of the second bearing 28 urges the destabilizer finger 88 into contact with the spoke 76 causing the spokes 76 to buckle in the tangential direction, as illustrated in FIG. 6. To ensure tangential contact of the destabilizer fingers 88 with the spokes 76, in some embodiments the destabilizer fingers 88 may be contoured to match a spoke profile of the spokes 76.

Figure 7:
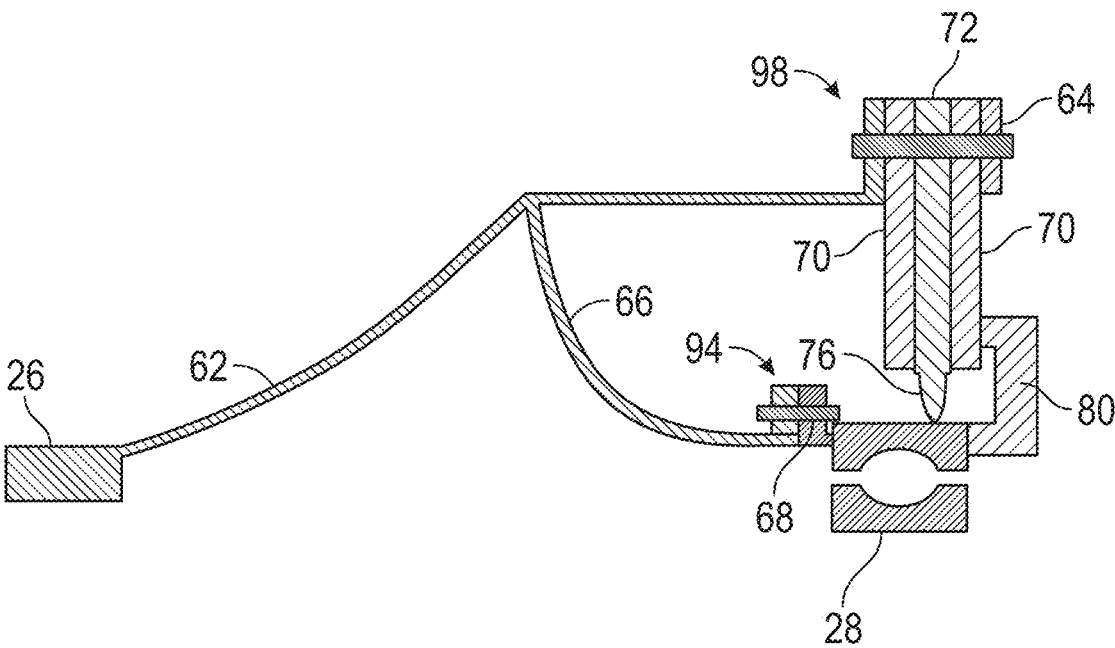
FIG. 7 is a schematic cross-sectional view of another embodiment of a bearing support arrangement of a gas turbine engine.
Figure 8:
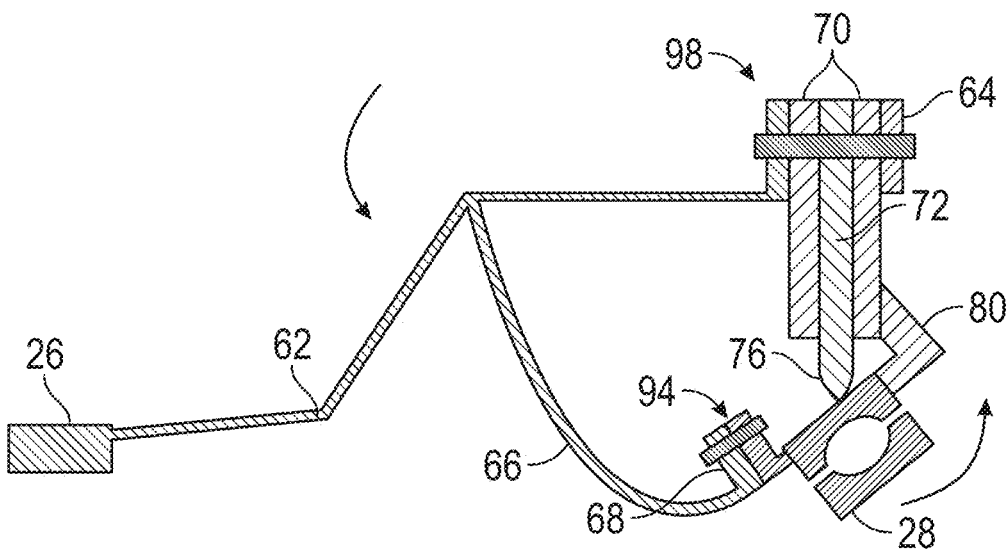
FIG. 8 is a schematic cross-sectional view of the embodiment of FIG. 7 in a fan blade off (FBO) event.
Figure 9:
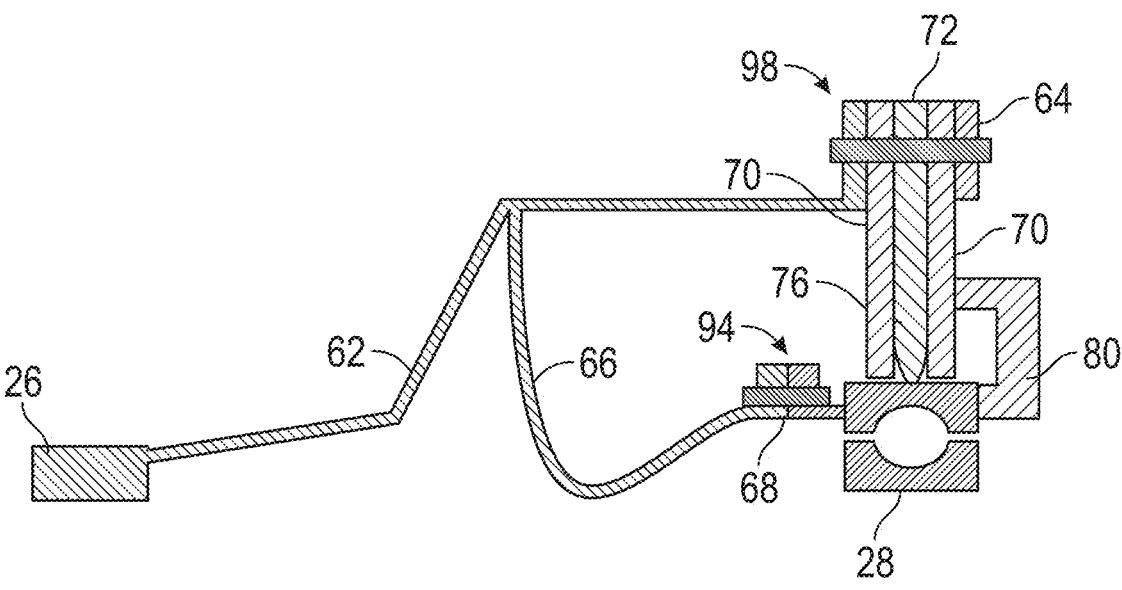
FIG. 9 is another schematic cross-sectional view of the embodiment of FIG. 7 in an FBO event.

Another embodiment is illustrated in FIGS. 7-9. In this embodiment, the radial support 72 is positioned axially between two bumpers 70, which sandwich the radial support 72. This allows the radial support 72 to buckle tangentially when contacted by the destabilizer finger 88 while minimizing axial deflection of the radial spokes 76. When the spokes 76 buckle tangentially, the spoke tips 78 translate tangentially and radially outwardly and the second bearing 28 is then supported by the two bumpers 70.

Figure 10:
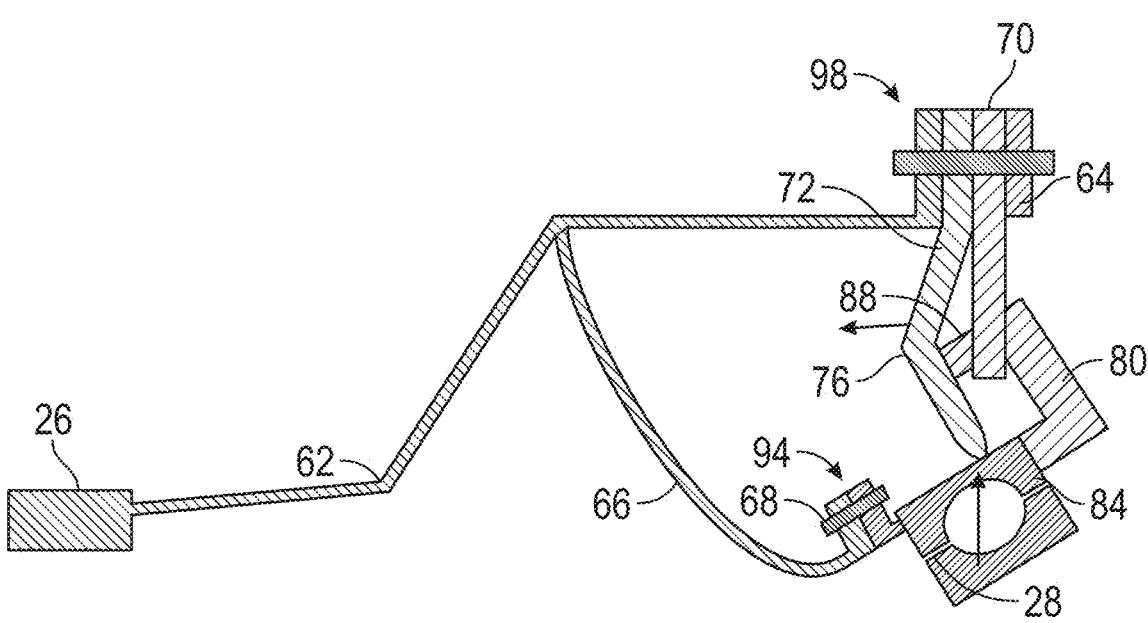
FIG. 10 is a schematic cross-sectional view of yet another embodiment of a bearing support arrangement of a gas turbine engine.

In a third embodiment, illustrated in FIG. 10, the destabilizer fingers 88 are circumferentially aligned with the plurality of spokes 76. In an FBO event, the destabilizer fingers 88 thus contact the plurality of spokes 76 in an axial direction, thus causing the plurality of spokes 76 to buckle in the axial direction.

Figure 11:
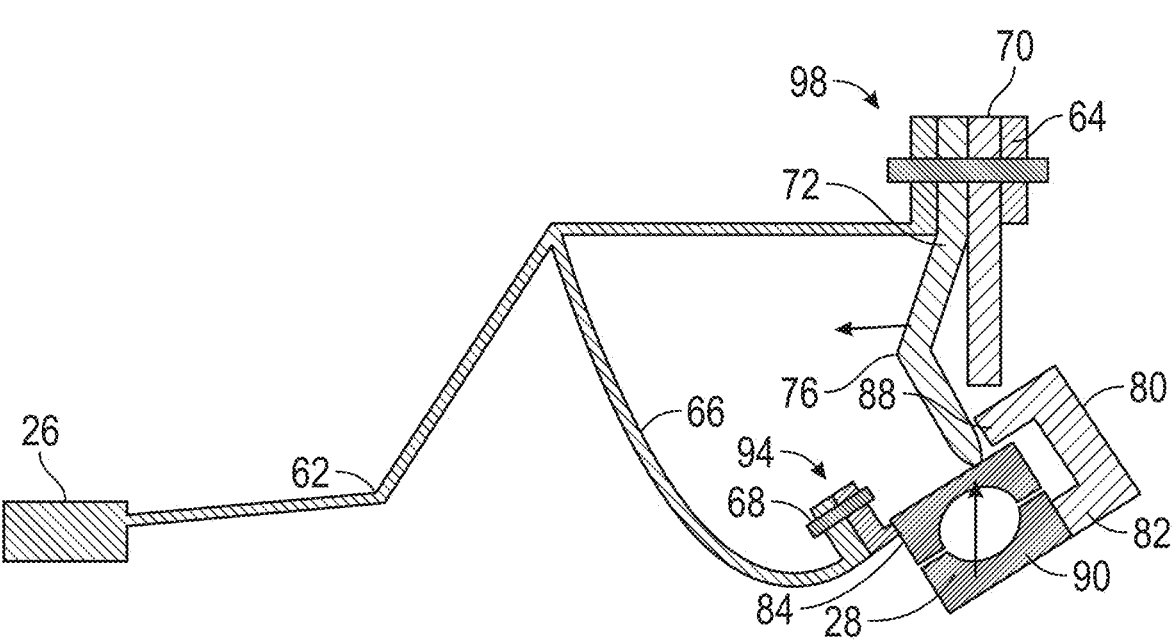
FIG. 11 is a schematic cross-sectional view of still another embodiment of a bearing support arrangement of a gas turbine engine.

A fourth embodiment is illustrated in FIG. 11. In this embodiment, the destabilizers 80 are connected to a bearing inner race 90, rather than the bearing outer race 84. This arrangement provides a higher relative angle between the destabilizers 80 and the spokes 76 during an FBO event, allowing for greater tolerances in the controlled axial gap between the two components. The destabilizers will also be rotating with the spool, and so any contact will result in both axial and tangential forces.

The embodiments disclosed herein provide that the two bearings 26 and 28 fail during an FBO event to limit the load and vibrations transferred from the rotor to the engine and aircraft structure caused by the resulting imbalance. The failure of the second bearing 28 is achieved via buckling of the second bearing support 66, enabling an overall design with lower normal operating stresses, thus improving low-cycle fatigue (LCF) performance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing arrangement of a gas turbine engine, comprising:
a first bearing supportive of a shaft;
a second bearing axially offset from the first bearing and supportive of the shaft;
a first bearing support extending from a bearing housing to the first bearing to support the first bearing;
a second bearing support extending to and supportive of the second bearing;
one or more radial bearing supports including a plurality of radial spokes extending between the bearing housing and the second bearing, the plurality of radial spokes configured to buckle under compression when radial loads at the second bearing exceed a predetermined threshold; and
at least one destabilizer secured to the second bearing and configured to contact at least one radial spoke of the plurality of radial spokes upon failure of the first bearing support to reduce the predetermined threshold sufficiently to initiate buckling of the plurality of radial spokes.

2. The bearing arrangement of claim 1, wherein the at least one destabilizer is secured to one of a bearing outer race or a bearing inner race of the second bearing.

3. The bearing arrangement of claim 1, wherein the at least one destabilizer is configured to contact the plurality of radial spokes in a tangential direction to initiate tangential buckling of the plurality of radial spokes.

4. The bearing arrangement of claim 3, wherein each destabilizer is located circumferentially between adjacent radial spokes of the plurality of radial spokes.

5. The bearing arrangement of claim 1, wherein the at least one destabilizer is configured to contact the plurality of radial spokes in an axial direction to initiate axial buckling of the plurality of radial spokes.

6. The bearing arrangement of claim 5, wherein each destabilizer is circumferentially aligned with a radial spoke of the plurality of radial spokes.

7. The bearing arrangement of claim 1, wherein the radial bearing support includes an outer ring disposed at the bearing housing, and the plurality of radial spokes extend from the outer ring to the second bearing.

8. The bearing arrangement of claim 1, wherein a spoke tip of each of the radial spokes are configured to contact the second bearing while not being secured thereto.

9. The bearing arrangement of claim 1, further comprising one or more bumpers axially offset from the radial bearing support configured to limit radial travel of the second bearing upon buckling of the plurality of radial spokes.

10. The bearing arrangement of claim 9, wherein the one or more bumpers is two bumpers, and the radial bearing support is disposed axially between the two bumpers.

11. A gas turbine engine, comprising:

a combustor;

a turbine driven by combustion products of the combustor;

a shaft driven by rotation of the turbine; and a bearing arrangement supportive of the shaft, the bearing arrangement including:

a first bearing;

a second bearing axially offset from the first;

a first bearing support extending from a bearing housing to the first bearing to support the first bearing;

a second bearing support to and supportive of the second bearing;

one or more radial bearing supports including a plurality of radial spokes extending between the bearing housing and the second bearing, the plurality of radial spokes configured to buckle under compression when radial loads at the second bearing exceed a predetermined threshold; and at least one destabilizer secured to the second bearing and configured to contact at least one radial spoke of the plurality of radial spokes upon failure of the first bearing support to reduce the predetermined threshold sufficiently to initiate buckling of the plurality of radial spokes.

12. The gas turbine engine of claim 11, wherein the at least one destabilizer is secured to one of a bearing outer race or a bearing inner race of the second bearing.

13. The gas turbine engine of claim 11, wherein the at least one destabilizer is configured to contact the plurality of radial spokes in a tangential direction to initiate tangential buckling of the plurality of radial spokes.

14. The gas turbine engine of claim 13, wherein each destabilizer is located circumferentially between adjacent radial spokes of the plurality of radial spokes.

15. The gas turbine engine of claim 11, wherein the at least one destabilizer is configured to contact the plurality of radial spokes in an axial direction to initiate axial buckling of the plurality of radial spokes.

16. The gas turbine engine of claim 15, wherein each destabilizer is circumferentially aligned with a radial spoke of the plurality of radial spokes.

17. The gas turbine engine of claim 11, wherein the radial bearing support includes an outer ring disposed at the bearing housing, and the plurality of radial spokes extend from the outer ring to the second bearing.

18. The gas turbine engine of claim 11, wherein a spoke tip of each of the radial spokes are configured to contact the second bearing while not being secured thereto.

19. The gas turbine engine of claim 11, further comprising one or more bumpers axially offset from the radial bearing support configured to limit radial travel of the second bearing upon buckling of the plurality of radial spokes.

20. The gas turbine engine of claim 19, wherein the one or more bumpers is two bumpers, and the radial bearing support is disposed axially between the two bumpers.

* * * * *